Patented July 5, 1927.

1,634,924

UNITED STATES PATENT OFFICE.

GEORGE STAFFORD WHITBY, OF MONTREAL, QUEBEC, CANADA, ASSIGNOR TO THE ROESSLER & HASSLACHER CHEMICAL CO., OF NEW YORK, N. Y., A CORPORATION OF NEW YORK.

ACCELERATOR FOR THE VULCANIZATION OF RUBBER.

No Drawing.     Application filed January 27, 1926. Serial No. 84,152.

The object of this invention is to provide a new and improved class of accelerators for the vulcanization of rubber which will give to the finished rubber product excellent physical properties such as desirable stress strain relationship, high tensile strength, rapidity of vulcanization at lower temperatures, and related properties.

I have discovered that polysulphides of a high order, containing five or more sulphur atoms in each molecule form especially rapid and valuable accelerators. In an application, S. N. 84,153, filed by me of even date herewith I have claimed a new composition of matter embodying a thiuram polysulphide of this type and in a second application, S. N. 84,154, I have claimed its use as an accelerator. This present invention relates to another class of compounds of polysulphide nature containing five or more sulphur atoms per molecule.

This invention relates to the use of compounds which are formed by the reaction of salts of xanthic acids with sulphur chlorides and more particularly to the products formed by treating the salts of xanthic acids with sulphur monochloride or sulphur dichloride. Specifically my invention deals with the product formed by sulphur chlorides with salts of the oxygen esters of xanthic acid of the general formula

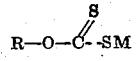

wherein R is any alkyl group and M is a metallic radical or equivalent group such as sodium, potassium, ammonium, etc.

Throughout the specification and claims I refer to specific sulphur chlorides as sulphur monochloride and sulphur dichloride giving these the formulæ of $S_2Cl_2$ and $SCl_2$ respectively. However, I do not wish to be limited in this since there has been considerable discussion as to the structures. Furthermore sulphur is very soluble in these sulphur chlorides and at times appears to be present in molecules of a polysulphide nature, having several loosely bound sulphur atoms in addition to those ascribed by the formula. I therefore prefer to express the sulphur chlorides above referred to as $S_xCl_2$.

If potassium ethyl xanthate, for example, be treated with a sulphur chloride, as $S_2Cl_2$, a reaction takes place between two molecules of the xanthate and one molecule of the chloride in a reaction believed to be as follows:

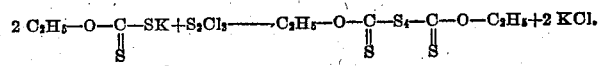

So also a reaction takes place with $SCl_2$ to give a trisulphide. I have now found that these reactions take place with salts of a great number of xanthates. I have prepared such compounds from potassium-ethyl xanthate, potassium-n-propyl xanthate, potassium-n-butyl xanthate, potassium iso-amyl xanthate, potassium iso-butyl xanthate and potassium allyl xanthate. These products and reactions I believe to be represented by the following general equations:

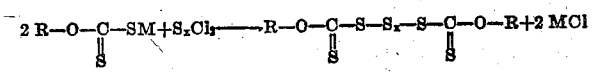

wherein R is an alkyl radical. Thus if $S_2Cl_2$ is used the product will be

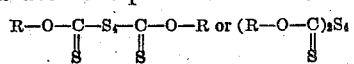

and $SCl_2$ will give

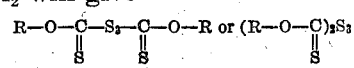

These compounds are carbalkoxy thione polysulphides. The preparation of these materials is illustrated by the following:

A. *Carbethoxy thione tetrasulphide.*

70 grams potassium ethyl xanthate were dissolved in 120 cc. water. 27 grams sulphur monochloride ($S_2Cl_2$) were added to this drop by drop while the mixture was cooled with ice and well agitated. A yellow oil was formed. The oil was extracted with ether; the ether solution was dried with calcium chloride and then the ether was distilled off. A yield of about 90% of theoretical was obtained.

B. Carbalkoxy (n-butyl) thione tetrasulphide.

56 grams potassium hydroxide were dissolved in a slight excess of n-butyl alcohol; the solution was cooled and 76 grams carbon bisulphide added while cooling and stirring. The potassium n-butyl xanthate which precipitated was filtered out and washed with a small amount of alcohol. This potassium salt was dissolved in water and chilled; 39.5 grams sulphur monochloride ($S_2Cl_2$) were added with stirring. A light yellow oil separated out. This was decanted, dissolved in acetone and filtered, and dried for a short time with calcium chloride. 69 grams of dry oil were obtained.

C. Carbalkoxy (n-butyl) thione trisulphide.

80 grams of potassium n-butyl xanthate were dissolved in water and cooled; 22 grams sulphur dichloride were stirred into the solution; a heavy oil settled out. This oil was dissolved in ether and the solution dried with calcium chloride. The ether was removed by distillation; 56 grams of a clear yellow oil were obtained.

These products when incorporated into a rubber mix, especially when an amine of the aniline type is also present, greatly accelerate the vulcanization of rubber, increase the tensile strength of the rubber and impart other desirable qualities. I have found it possible to use these accelerators in rubber mixes without added free sulphur and still obtain satisfactory vulcanization.

As examples of vulcanized rubber made with these materials the following are given:

EXAMPLE I.

*Carbalkoxy (n-propyl) thione tetrasulphide.*

6 grams of the above compound were mixed with 6.52 grams dibenzyl amine; heat was evolved and yellow crystals separated out. This mixture was used as the accelerator in the formula:

100 parts by weight smoked sheet, 5 parts by weight zinc oxide, 5 parts by weight sulphur, 1.3 parts by weight accelerator. After milling, the rubber mixture was cured at the temperature of 10 pound steam and the following results obtained:

| Time of cure. | Stretch. | Load at 600% elong. | Tensile. |
|---|---|---|---|
| 40 minutes. | 9.3 | 1025 lbs./in.² | 3284 lbs./in.² |
| 50 minutes. | 8.9 | 1700 lbs./in.² | 4928 lbs./in.² |
| 60 minutes. | 8.8 | 1800 lbs./in.² | 3993 lbs./in.² |

EXAMPLE II.

*Carbethoxy thione tetrasulphide.*

100 parts by weight smoked sheet, 5 parts by weight zinc oxide, 5 parts by weight of above compound, 2.5 parts by weight aniline.

The above ingredients were mixed on the rubber mill and the compound cured for 60 minutes at the temperature of 10 pound steam; elongation 9; load at 600% elong. 700 lbs./in.²; tensile 3119 lbs./in.².

It will be noted that the above example illustrates an application of my invention wherein no free sulphur is compounded with the rubber mix as is usual in the art; the poly-sulphide accelerator contains the requisite sulphur for vulcanization.

EXAMPLE III.

*Carbalkoxy (iso-propyl) thione tetrasulphide.*

6 grams of the above compound were mixed with 4.35 grams ethylaniline; crystals separated overnight. This mixture was used as the accelerator in the rubber formula of Example I, using 2.15 parts by weight of accelerator and cured at the temperature of 10 pound steam.

| Time of cure. | Stretch. | Load at 600% elong. | Tensile. |
|---|---|---|---|
| 30 minutes. | 8.2 | 2400 lbs./in.² | 4812 lbs./in.² |
| 45 minutes. | 8.9 | 2200 lbs./in.² | 4707 lbs./in.² |
| 60 minutes. | 8.5 | 2000 lbs./in.² | 3563 lbs./in.² |

EXAMPLE IV.

*Carbalkoxy (iso-propyl) thione trisulphide.*

100 parts by weight smoked sheet, 5 parts by weight zinc oxide, 5 parts by weight sulphur, 1.25 parts by weight of above compound, 1 part by weight ethyl aniline.

The above ingredients were mixed on the rubber mill and cured at the temperature of 10 pound steam.

| Time of cure. | Stretch. | Load at 600% elong. | Tensile. |
|---|---|---|---|
| 30 minutes. | 8.6 | 1625 lbs./in.² | 4180 lbs./in.² |
| 45 minutes. | 8.6 | 1325 lbs./in.² | 3414 lbs./in.² |
| 60 minutes. | 9.0 | 1000 lbs./in.² | 3536 lbs./in.² |

EXAMPLE V.

*Carbalkoxy (iso-propyl) thione trisulphide.*

Formula and mixing as in IV above, but using 0.77 parts by weight of aniline instead of 1 part ethyl aniline; same temperature of cure.

| Time of cure. | Stretch. | Load at 600% elong. | Tensile. |
|---|---|---|---|
| 20 minutes. | 8.3 | 2100 lbs./in.² | 4202 lbs./in.² |
| 30 minutes. | 8.3 | 2000 lbs./in.² | 4079 lbs./in.² |
| 45 minutes. | 8.4 | 1300 lbs./in.² | 4172 lbs./in.² |
| 60 minutes. | 8.8 | 1300 lbs./in.² | 3758 lbs./in.² |

EXAMPLE VI.

*Carbalkoxy (iso-amyl) thione trisulphide.*

10 grams of the above compounds were mixed with 5.4 grams aniline. Heat was evolved and crystals formed. 2.09 parts of this mixture were used as the accelerator in the rubber formula of Example I. Cured at temperature of 10 pound steam.

| Time of cure. | Stretch. | Load at 600% elong. | Tensile. |
|---|---|---|---|
| 50 minutes. | 8.7 | 2050 lbs./in.² | 5330 lbs./in.² |
| 60 minutes. | 8.5 | 2300 lbs./in.² | 4651 lbs./in.² |

Example VII.

*Carbalkoxy (n-butyl) thione trisulphide.*

6 grams of this compound were mixed with 7.15 grams dibenzylamine; heat was evolved and crystals separated. 1.37 parts by weight of this mixture was used as the accelerator in the rubber formula of Example I.

| Time of cure. | Stretch. | Load at 600% elong. | Tensile. |
|---|---|---|---|
| 40 minutes. | 9.5 | 750 lbs./in.² | 3313 lbs./in.² |
| 50 minutes. | 8.4 | 1675 lbs./in.² | 4402 lbs./in.² |
| 60 minutes. | 8.7 | 1600 lbs./in.² | 4815 lbs./in.² |

Example VIII.

*Carbalkoxy (iso-amyl) thione tetrasulphide.*

1.25 parts of the above were used as the accelerator in the rubber compound of Example I and the mixture cured at the temperature of 10 pound steam.

| Time of cure. | Stretch. | Load at 600% elong. | Tensile. |
|---|---|---|---|
| 60 minutes. | 9.61 | 500 lbs./in.² | 2624 lbs./in.² |
| 70 minutes. | 8.82 | 600 lbs./in.² | 2479 lbs./in.² |

Example IX.

*Carbalkoxy (n-propyl) thione tetrasulphide.*

0.625 parts of the above and 0.825 parts of dibenzylamine were incorporated as the accelerator in the rubber formula of Example I and the compound cured at the temperature of 10 pound steam.

| Time of cure. | Stretch. | Load at 600% elong. | Tensile. |
|---|---|---|---|
| 40 minutes. | 9.3 | 1200 lbs./in.² | 4044 lbs./in.² |
| 50 minutes. | 8.9 | 1800 lbs./in.² | 5417 lbs./in.² |
| 60 minutes. | 8.82 | 1800 lbs./in.² | 4805 lbs./in.² |

While I have given above specific examples of methods of preparing my accelerators and specific uses thereof in rubber mixtures I do not wish to be limited to the methods of manufacture given nor the methods of use given since my accelerators are applicable in many variations and may be prepared in any suitable way.

What I claim is:

1. A process of treating rubber or similar material which comprises incorporating with the rubber compound a vulcanizing agent, an amine, carbalkoxy thione polysulphide containing 5 or more sulphur atoms per molecule, and vulcanizing the rubber.

2. A process of treating rubber or similar material which comprises incorporating with the rubber compound a carbalkoxy thione polysulphide containing 5 or more sulphur atoms per molecule, an aromatic amine, and vulcanizing the rubber.

3. A process of treating rubber or similar material which comprises incorporating with the rubber a vulcanizing agent, an amine, and an organic compound comprising the group

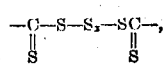

and vulcanizing the rubber.

4. A process of treating rubber or similar material which comprises incorporating with the rubber a vulcanizing agent, an amine, and an organic compound comprising the group

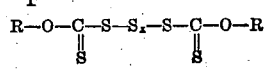

wherein R is an organic radical, and vulcanizing the rubber.

5. A process of treating rubber or similar material which comprises incorporating with the rubber a vulcanizing agent, an amine, and an organic compound comprising the group

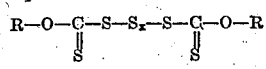

wherein R is an alkyl radical, and vulcanizing the rubber.

6. A process of treating rubber or similar material which comprises incorporating with the rubber a vulcanizing agent, an aromatic amine, and an organic compound comprising the group

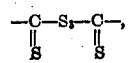

and vulcanizing the rubber.

7. A process of treating rubber or similar material which comprises incorporating with the rubber a vulcanizing agent, an amine, and the reaction product of a xanthate with a sulphur chloride of the formula $S_xCl_2$, and vulcanizing the rubber.

8. A process of treating rubber or similar material which comprises incorporating with the rubber a vulcanizing agent, an aromatic amine of the aniline type, and the reaction product of a xanthate with a sulphur chloride of the formula $S_xCl_2$, and vulcanizing the rubber.

9. A process of treating rubber or similar material which comprises incorporating with the rubber a vulcanizing agent, an aromatic amine, and the reaction product of the potassium salt of an alkyl xanthic acid with sulphur monochloride, and vulcanizing the rubber.

10. A process of treating rubber or similar material which comprises incorporating with the rubber a vulcanizing agent, an aromatic amine, and the reaction product of potassium butyl xanthate with a sulphur chloride of the formula $S_xCl_2$, and vulcanizing the rubber.

11. A process of treating rubber or similar material which comprises incorporating with the rubber a vulcanizing agent, an aromatic amine, and the reaction product of potassium butyl xanthate with sulphur monochloride, and vulcanizing the rubber.

12. The process of accelerating the vulcanization of rubber comprising vulcanizing the same in the presence of a carbalkoxy thione polysulphide containing 5 or more sulphur atoms per molecule.

13. The process of accelerating the vulcanization of rubber comprising vulcanizing the same in the presence of an organic compound comprising the group.

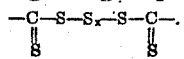

14. The process of accelerating the vulcanization of rubber comprising vulcanizing the same in the presence of an organic compound comprising the group

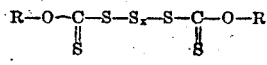

(wherein R is an organic radical).

15. The process of accelerating the vulcanization of rubber comprising vulcanizing the same in the presence of an organic compound comprising the group

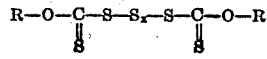

(wherein R is an alkyl radical).

16. The process of accelerating the vulcanization of rubber comprising vulcanizing the same in the presence of an organic compound comprising the group

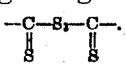

17. The process of accelerating the vulcanization of rubber comprising vulcanizing the same in the presence of the reaction product of a xanthate with a sulphur chloride of the formula $S_xCl_2$.

18. The process of accelerating the vulcanization of rubber comprising vulcanizing the same in the presence of the reaction product of a salt of an alkyl xanthic acid with sulphur monochloride.

19. The process of accelerating the vulcanization of rubber comprising vulcanizing the same in the presence of the reaction product of potassium butyl xanthate with sulphur monochloride.

20. A vulcanized rubber derived from rubber or similar material incorporated with a vulcanizing agent and a reaction product of a xanthate with a sulphur chloride of the formula $S_xCl_2$.

21. A vulcanized rubber derived from rubber or similar material incorporated with a vulcanizing agent an amine, and a reaction product of an alkyl xanthate with a sulphur chloride of the formula $S_xCl_x$.

22. A vulcanized rubber derived from rubber or similar material with which has been incorporated an amine and a reaction product of potassium butyl xanthate with sulphur monochloride.

23. The method of vulcanizing rubber without the addition of sulfur, which comprises subjecting the rubber to vulcanization with an organic polysulfide of the general formula $(-CS)_2S_x$ (where $x$ is a number greater than 2) as the vulcanizing agent.

Signed at Perth Amboy in the county of Middlesex and State of New Jersey this 16th day of January, A. D. 1926.

GEORGE STAFFORD WHITBY.